Patented Mar. 16, 1937

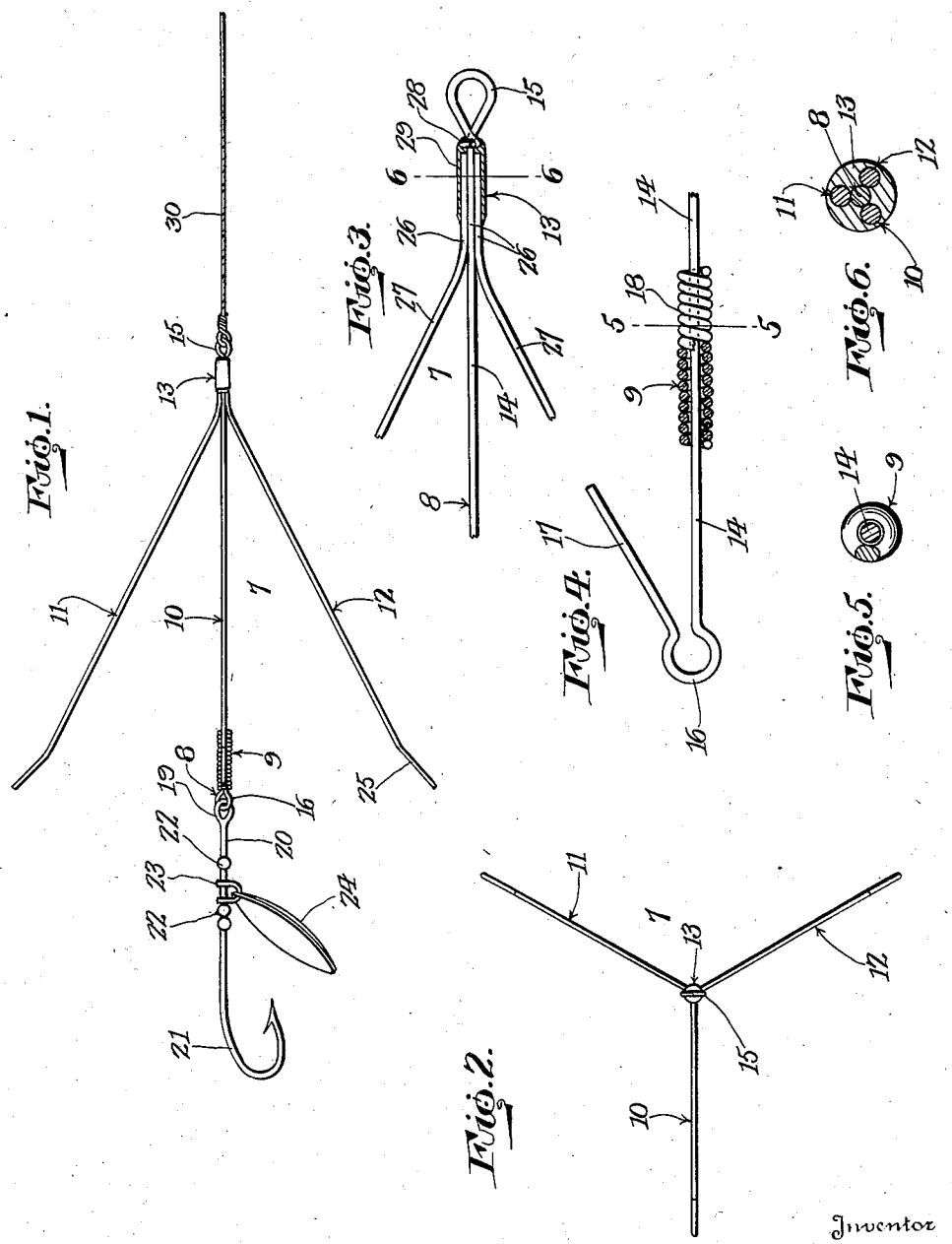

2,074,258

UNITED STATES PATENT OFFICE 2,074,258

PROTECTING ATTACHMENT FOR ARTIFICIAL BAIT

John Fravel, Ionia, Mich.

Application May 9, 1935, Serial No. 20,665

1 Claim. (Cl. 43—39)

My invention relates to a protecting attachment for artificial bait for casting or trolling and which, when used, is arranged inwardly of the bait.

The object of my invention is to provide, in a manner as hereinafter set forth, means to protect artificial bait as against weeds and snags, or any other similar thing that usually results in loss of the bait.

A further object of the invention is to provide, in a manner as hereinafter set forth, a protecting attachment for the purpose referred to which prevents the lure from bumping into weeds and leads the lure around in a natural manner.

A further object of the invention is to provide, in a manner as hereinafter set forth, a protecting attachment for the purpose referred to which is of simple and light construction to allow floating baits to lie on the surface of the water when not retrieved.

A further object of the invention is to provide, in a manner as hereinafter set forth, a protecting attachment for the purpose referred to, finished with a high chromium effect which involves the theory of a mirror and causes the attachment to be practically invisible when in use.

A further object of the invention is to provide a protecting attachment for the purpose referred to constructed in a manner as hereinafter set forth to cause the lure to be led around the weeds from one side or the other, not touching them as the natural minnow would.

A further object of the invention is to provide, in a manner as hereinafter set forth, a protecting attachment for artificial bait and which, when installed with respect to a metallic lure or spoon, will allow the back hooks to cover over the weeds without getting hooked up.

To the above ends essentially and to others which may hereinafter appear, my invention consists of such parts and such combination of parts which fall within the scope of the invention as claimed.

In the drawing:

Figure 1 is a side elevation of the attachment coupled to a hook, a lure and a fishing line, Figure 2 is a top plan view of the attachment, Figure 3 is a fragmentary view, upon an enlarged scale, in side elevation and partly in section of the attachment, Figure 4 is a fragmentary view, upon an enlarged scale, in side elevation and partly in section illustrating the hook coupling means opened, Figure 5 is a section on line 5—5, Figure 4, and Figure 6 is a section on line 6—6, Figure 3.

The protecting attachment, in accordance with my invention, includes an open outer end skeleton body 7 of pyramidal contour having its outer end and each of its sides in the form of an equilateral triangle. The body 7 is formed of an axially arranged inner element 8 constituting a combined leader and coupler, a clamping element 9 slidably mounted on element 8 and a set of equi-distant spaced outer elements 10, 11 and 12 providing the corners of body portion 7 and protectors for the lure or bait. The body portion also includes a means 13 for securing the leading end terminal portions of elements 10, 11 and 12 circumferentially in spaced relation to the leading end terminal portion of the element 8. The elements 8, 9, 10, 11 and 12 are formed of very light wire having a high chromium effect to make body portion 7 practically invisible.

The element 8 includes a stem 14, an eye or loop 15 at the leading end of stem 14, a split resilient loop 16 at and offset laterally in both directions with respect to the follower end of stem 14 and a shiftable arm 17 extending rearwardly from one of the edges of the split of the loop. The other edge of the split of the loop merges into the follower end of stem 14.

The element 9 consists of a sleeve 18 slidably mounted on stem 14 and formed from a series of closely arranged wire coils. The element 9 is employed for overlapping and clamping arm 17 against stem 14 for maintaining the loop 16 closed.

The loop 16 receives the eye 19 at the leading end of the shank 20 of a hook 21. The shank 20 has spaced stops 22 between which is slidably arranged on shank 20 a coupling 23 to which the lure or spoon 24 is loosely connected. The element 9 coacts with the arm 17 for retaining the hook 21 connected up to the element 8.

The elements 10, 11 and 12 are of like construction and each consists of a leading end stretch 25, a leading end stretch 26 and an intermediate stretch 27 of materially greater length than the other stretches. The stretch 27 is disposed at an outward inclination throughout with respect to the leading end of stretch 26. The stretch 25 is disposed at an outward inclination with respect to the leading end of stretch 27 and at a greater inclination than that of stretch 27. That part of each element 10, 11 and 12 formed of the stretches 26, 27 is resilient. The stretches 25 of elements 10, 11 and 12 abut and are disposed in sidewise spaced relation circumferentially of the stem 14 at a point spaced from the forward end of the latter. The forward end portion of the stem 14 forms the loop 15, and the return part of the loop has a free end portion 28 encircling the stem 14 at the rear end of the loop. The forward ends of the stretches 26 are adjacent and rearwardly of the encircling portion 28. The leading end edges of the elements 10, 11 and 12 align with the loop 16 of the element 8 transversely of the latter.

The means 13 is in the form of a mass of welding material 29 which has embedded therein the stretches 26 of members 10, 11 and 12, as well as the stem encircling part 28 of the loop 15. The means 13 is extended between the leading end edges of stretches 26 and the stem encircling part 8 of loop 15. The means 13 surrounds major forward portion of the stretches 26 and the stem encircling part 28. Attached to the loop or eye 15 is the line 30.

What I claim is:

A protecting attachment for artificial bait comprising a skeleton body including a centrally arranged combined coupler and leader element and a plurality of guard elements disposed concentrically of the coupler and leader element, means at the follower end of said coupler and leader element for connecting a fishing appliance thereto, a loop at the leading end of said coupler and leader element for connecting a fishing line thereto, said loop including a return part having a free end portion encircling said coupler and leader element, each of said guard elements having a leading end stretch disposed flatly against and in parallel relation to said coupler and leader element with the leading ends of said stretches disposed adjacent the coupler and leader encircling free end portion of said loop, said guard elements including diverging stretches extending outwardly and rearwardly from the leading stretches thereof, and a cementitious body encircling and concealing said coupler and leader encircling free end portion of said loop and the forward end portions of said leading stretches.

JOHN FRAVEL.